United States Patent
Goto

(10) Patent No.: US 11,217,986 B2
(45) Date of Patent: Jan. 4, 2022

(54) INTELLIGENT POWER MODULE INCLUDING SEMICONDUCTOR ELEMENTS OF A PLURALITY OF PHASES DRIVE CIRCUITS OF A PLURALITY OF PHASES AND A PLURALITY OF TEMPERATURE DETECTION ELEMENTS

(71) Applicant: Mitsubishi Electric Corporation, Tokyo (JP)

(72) Inventor: Akiko Goto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 60 days.

(21) Appl. No.: 16/594,425

(22) Filed: Oct. 7, 2019

(65) Prior Publication Data

US 2020/0194994 A1    Jun. 18, 2020

(30) Foreign Application Priority Data

Dec. 12, 2018  (JP) .............................. JP2018-232211

(51) Int. Cl.
H02M 1/32          (2007.01)
H02H 7/122         (2006.01)
(Continued)

(52) U.S. Cl.
CPC ............ *H02H 5/044* (2013.01); *H02H 7/205* (2013.01)

(58) Field of Classification Search
CPC .. H02M 1/32; H02M 2001/327; H02H 7/122; H02H 7/1227; H02H 5/044; G01K 7/01
See application file for complete search history.

(56) References Cited

U.S. PATENT DOCUMENTS 9,874,614 B2 *  1/2018  Osanai ................... G01R 31/42
2008/0238529 A1 * 10/2008  Kumagai ................ G01K 7/01
                                                                327/512
(Continued)

FOREIGN PATENT DOCUMENTS

JP      2009-231374 A    10/2009
JP      2012-208055 A    10/2012
(Continued)

OTHER PUBLICATIONS

An Office Action mailed by the Japanese Patent Office dated Nov. 2, 2021, which corresponds to Japanese Patent Application No. 2018-232211 and is related to U.S. Appl. No. 16/594,425; with English language translation.

*Primary Examiner* — Sisay G Tiku
(74) *Attorney, Agent, or Firm* — Studebaker & Brackett PC

(57) ABSTRACT

An object of the present invention is to stop the driving of a semiconductor element swiftly at a time of abnormality while sharing an output terminal between temperature information and an error signal in an IPM. In the intelligent power module of the present invention, each drive circuit includes an output control circuit configured to select the error signal while the error signal generation circuit outputs the error signal, to select the temperature signal while the error signal generation circuit does not output the error signal, and to output a selected signal as an alarm signal. The temperature signal generation circuit is configured to change the voltage value of the temperature signal in accordance with the element temperature of the specific semiconductor element within a voltage range different from the voltage value of the error signal.

7 Claims, 13 Drawing Sheets

(51) Int. Cl.
*H02H 7/08* (2006.01)
*H02H 5/04* (2006.01)
*H02H 7/20* (2006.01)

(56) References Cited

U.S. PATENT DOCUMENTS

| | | | | |
|---|---|---|---|---|
| 2012/0146782 | A1* | 6/2012 | Komatsu | H03K 17/0822 340/501 |
| 2012/0224288 | A1* | 9/2012 | Uota | H03K 17/0828 361/79 |
| 2013/0094114 | A1* | 4/2013 | Shimizu | H03K 17/082 361/87 |
| 2013/0106470 | A1* | 5/2013 | Takagiwa | H03K 17/168 327/109 |
| 2013/0229840 | A1 | 9/2013 | Nakamori | |
| 2015/0023076 | A1* | 1/2015 | Nakamori | H02M 7/48 363/56.03 |
| 2015/0116885 | A1* | 4/2015 | Joko | H02H 5/041 361/104 |
| 2015/0180227 | A1* | 6/2015 | Sekigawa | H02H 9/04 361/88 |
| 2016/0011266 | A1* | 1/2016 | Osanai | G01R 31/42 324/762.01 |
| 2017/0019092 | A1* | 1/2017 | Taoka | H03K 17/082 |
| 2017/0077919 | A1* | 3/2017 | Nakamori | H02M 1/08 |
| 2017/0093390 | A1* | 3/2017 | Tsurumaru | H03K 17/08128 |
| 2018/0269677 | A1* | 9/2018 | Yamamura | H02M 1/08 |
| 2018/0367023 | A1* | 12/2018 | Terashima | H03K 17/18 |
| 2019/0326898 | A1* | 10/2019 | Taguchi | H02P 29/024 |

FOREIGN PATENT DOCUMENTS

| | | |
|---|---|---|
| JP | 2013-183595 A | 9/2013 |
| JP | 2014-093903 A | 5/2014 |
| JP | 2014-098614 A | 5/2014 |

\* cited by examiner

F I G. 1 4
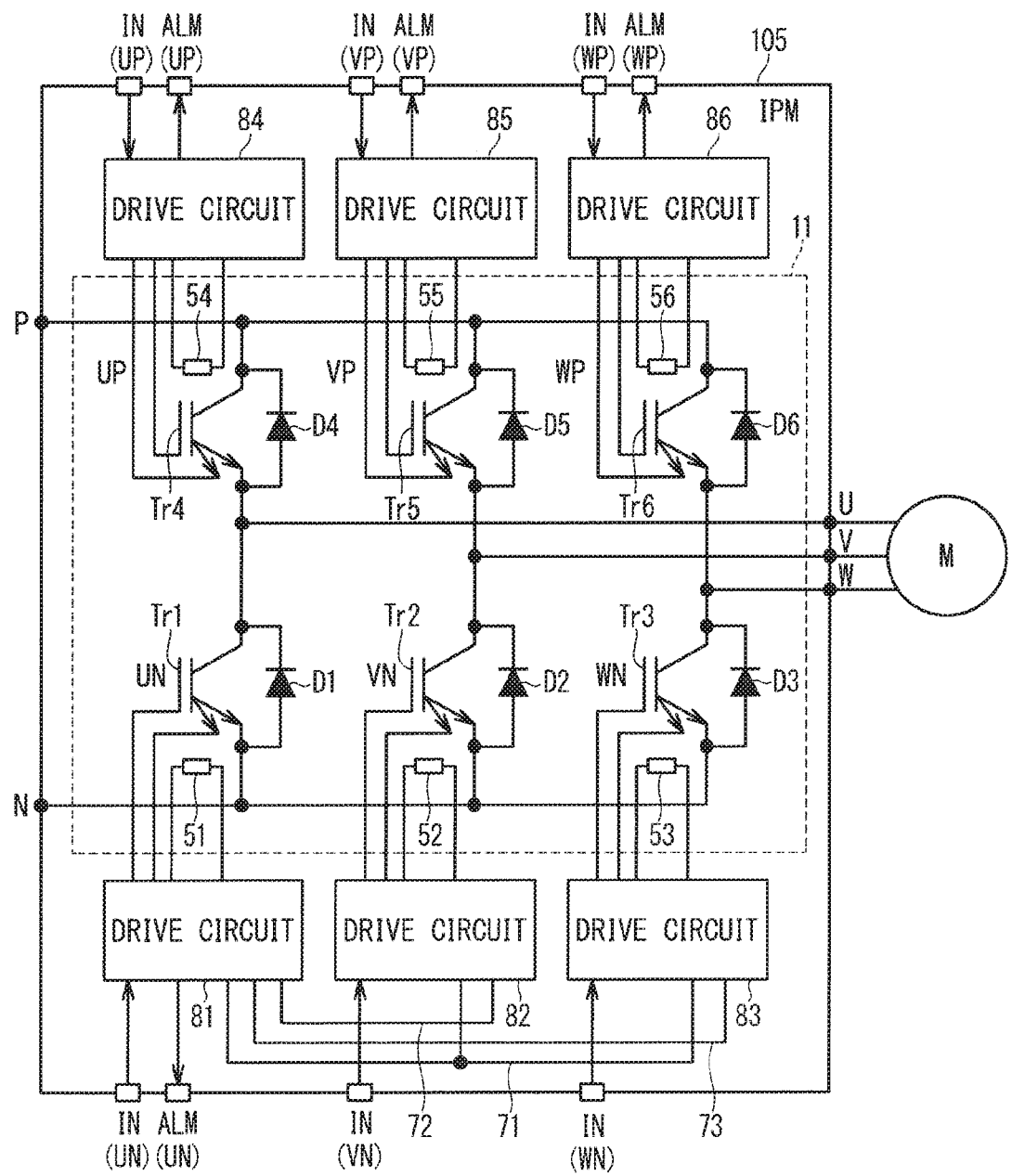

INTELLIGENT POWER MODULE INCLUDING SEMICONDUCTOR ELEMENTS OF A PLURALITY OF PHASES DRIVE CIRCUITS OF A PLURALITY OF PHASES AND A PLURALITY OF TEMPERATURE DETECTION ELEMENTS

BACKGROUND OF THE INVENTION

Field of the Invention

The invention relates to an intelligent power module.

Description of the Background Art

An intelligent power module (IPM) is obtained by modularizing a plurality of semiconductor elements, their drive circuits, protection circuits, and output circuits into one electronic component. Here, a semiconductor element includes a switching element such as an Integrated Gate Bipolar Transistor (IGBT) and a power Metal-Oxide Semiconductor Field Effect Transistor (MOSFET). A protection circuit detects an abnormality such as voltage drop of control voltage, overheating, short circuit or overcurrent of each semiconductor element. An output circuit generates an error signal in response to an abnormality detection signal output from the protection circuit, and outputs the error signal to an inverter control unit outside the IPM.

In the semiconductor element, the element temperature rises due to the occurrence of damage associated with current energization or switching. In recent years, there has been an increasing demand for constant monitoring of the element temperature of the semiconductor element by the inverter control unit. As final products such as inverters, processing machinery or electrical appliances are improved in functionality, become smaller, lighter or lower the price, semiconductor devices that are included in inverters are also required to have complex switching operations, smaller packages, lighter weights, and be lower in price due to the upgraded semiconductor elements or components. As the semiconductor device is downsized, the element temperature tends to rise, and the failure probability tends to increase accordingly. The excessive rising of the element temperature shortens the lifetime of the semiconductor device shorter than expected. Therefore, it is required that the inverter control unit constantly monitors the element temperature to prevent the element temperature from rising excessively by, for example, adjusting an applied signal as necessary, and a reasonable product life in use of the product is realized.

In the related art, in order to make the inverter control unit constantly monitor the element temperature of the semiconductor element (hereinafter simply referred to as "element temperature"), the IPM is required to externally output an analog voltage according to the element temperature through a dedicated terminal. Accordingly, there has been a problem that the increase in the number of output terminals leads to the increase in size and cost of the semiconductor device. In addition, with the provision of dedicated terminals, the number of output terminals or the external form differs from that of IPMs that do not externally output the element temperature, and in the final product, there has also been a problem that parts such as an external control board or a heat sink are not commonized, leading to increase in cost from the viewpoint of management cost.

For such problems, Japanese Patent Application Laid-Open No. 2014-93903 proposes a method of sharing an output terminal between a temperature signal and an error signal by providing an alarm signal with information on the time axis direction such as a pulse width or a PWM signal. According to the method, external output of the element temperature without increase in the number of output terminal of the semiconductor device is ensured at reasonable cost with high accuracy.

However, in the method of Japanese Patent Application Laid-Open No. 2014-93903, it requires some time for processing as the inverter control unit stores an alarm signal for a certain period, and determines, from the signal interval, whether the alarm signal indicates temperature information or an abnormal state. Therefore, it takes some time for the inverter control unit to stop the inverter control after the IPM outputs the alarm signal. And a drive signal is continuously applied to the semiconductor element during that time; therefore, there has been a problem that the failure probability of the semiconductor element or the inverter is increased.

SUMMARY

An intelligent power module of the present invention includes semiconductor elements of a plurality of phases, drive circuits of a plurality of phases, and a plurality of temperature detection elements. The drive circuits of a plurality of phases are configured to drive the semiconductor devices of the plurality of phases. The plurality of temperature detection elements are configured to detect respective element temperatures of the semiconductor elements of the plurality of phases. Each drive circuit includes a gate control circuit, a protection circuit, an error signal generation circuit, a temperature signal generation circuit, and an output control circuit. The gate control circuit is configured to control input to a gate terminal of the semiconductor element in a subject phase. The protection circuit detects an abnormality of the semiconductor element in the subject phase. The error signal generation circuit is configured to output an error signal when the protection circuit detects the abnormality. The temperature signal generation circuit is configured to generate a temperature signal of a voltage value corresponding to the element temperature of a specific semiconductor element which is any one semiconductor element of the semiconductor elements of the plurality of phases. The output control circuit is configured to select the error signal while the error signal generation circuit outputs the error signal, to select the temperature signal while the error signal generation circuit does not output the error signal, and to output a selected signal as an alarm signal. The temperature signal generation circuit is configured to change the voltage value of the temperature signal in accordance with the element temperature of the specific semiconductor element within a voltage range different from the voltage value of the error signal.

According to the intelligent power module of the present invention, one of the error signal and the temperature signal is output as an alarm signal; therefore, an output terminal is shared between the both signals. Also, the voltage value of the temperature signal is a different voltage range from the voltage value of the error signal; therefore, an inverter control unit that receives the alarm signal can swiftly determine whether the alarm signal is the error signal or the temperature signal from the voltage value of the alarm signal and swiftly stop the driving of the semiconductor element at the time of abnormality.

These and other objects, features, aspects and advantages of the present invention will become more apparent from the

BRIEF DESCRIPTION OF THE DRAWINGS

FIG. 14 is a configuration diagram illustrating an IPM of Embodiment 5; and

DESCRIPTION OF THE PREFERRED EMBODIMENTS

A. Underlying Technique

Figure 1:
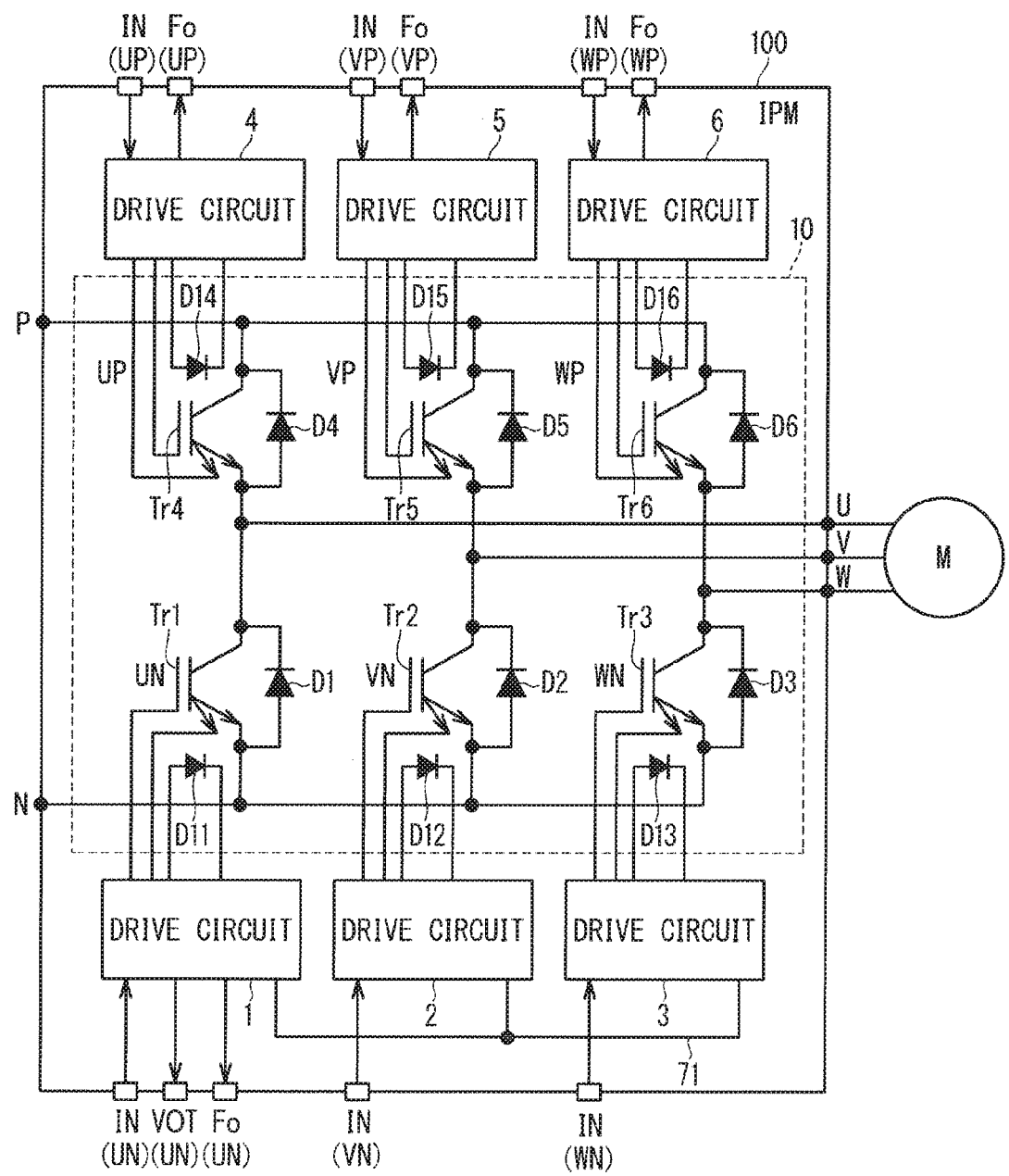
FIG. 1 is a configuration diagram illustrating an IPM of an underlying technique.

FIG. 1 is a configuration diagram illustrating principal components of an IPM 100 of an underlying technique. The IPM 100 is configured to include an inverter 10 and drive circuits 1 to 6. The inverter 10 includes six IGBTs Tr1 to Tr6, freewheel diodes D1 to D6 connected antiparallel between respective emitters and collectors of the IGBTs Tr1 to Tr6, and diodes D1 to D16 as temperature detection elements.

The IGBT Tr1 and the IGBT Tr4, the IGBT Tr2 and the IGBT Tr5, and the IGBT Tr3 and the IGBT Tr6 are connected in series, respectively, to form U-phase, V-phase, and W-phase half bridge circuits. These three sets of half bridge circuits are connected in parallel between a positive electrode terminal P and a negative electrode terminal N connected to a DC power supply (not shown) to form a three-phase full bridge circuit. Specifically, the emitter terminals of the IGBTs Tr1 to Tr3 are connected to the negative electrode terminal N, and the collector terminals of the IGBTs Tr4 to Tr6 are connected to the positive electrode terminal P. That is, the IGBT Tr1 configures a UN-phase, the IGBT Tr2 configures a VN-phase, the IGBT Tr3 configures a WN-phase, the IGBT Tr4 configures a UP-phase, the IGBT Tr5 configures a VP-phase, and the IGBT Tr6 configures a WP-phase.

The drive circuit 1 is connected to a gate terminal of the IGBT Tr1. That is, the drive circuit 1 is a drive circuit of the UN-phase. Similarly, drive circuits 2 to 6 are connected to gate terminals of the IGBTs Tr2 to Tr6, respectively. That is, the drive circuits 2 to 6 are drive circuits of the VN-phase, the WN-phase, the UP-phase, the VP-phase, and the WP-phase, respectively. The inverter 10 including the three-phase full bridge circuit converts DC power supplied from a DC power supply into three-phase AC power, and supplies it to a motor M which is an AC load. Noted that in FIG. 1, the motor M is an example of an AC load.

Figure 2:
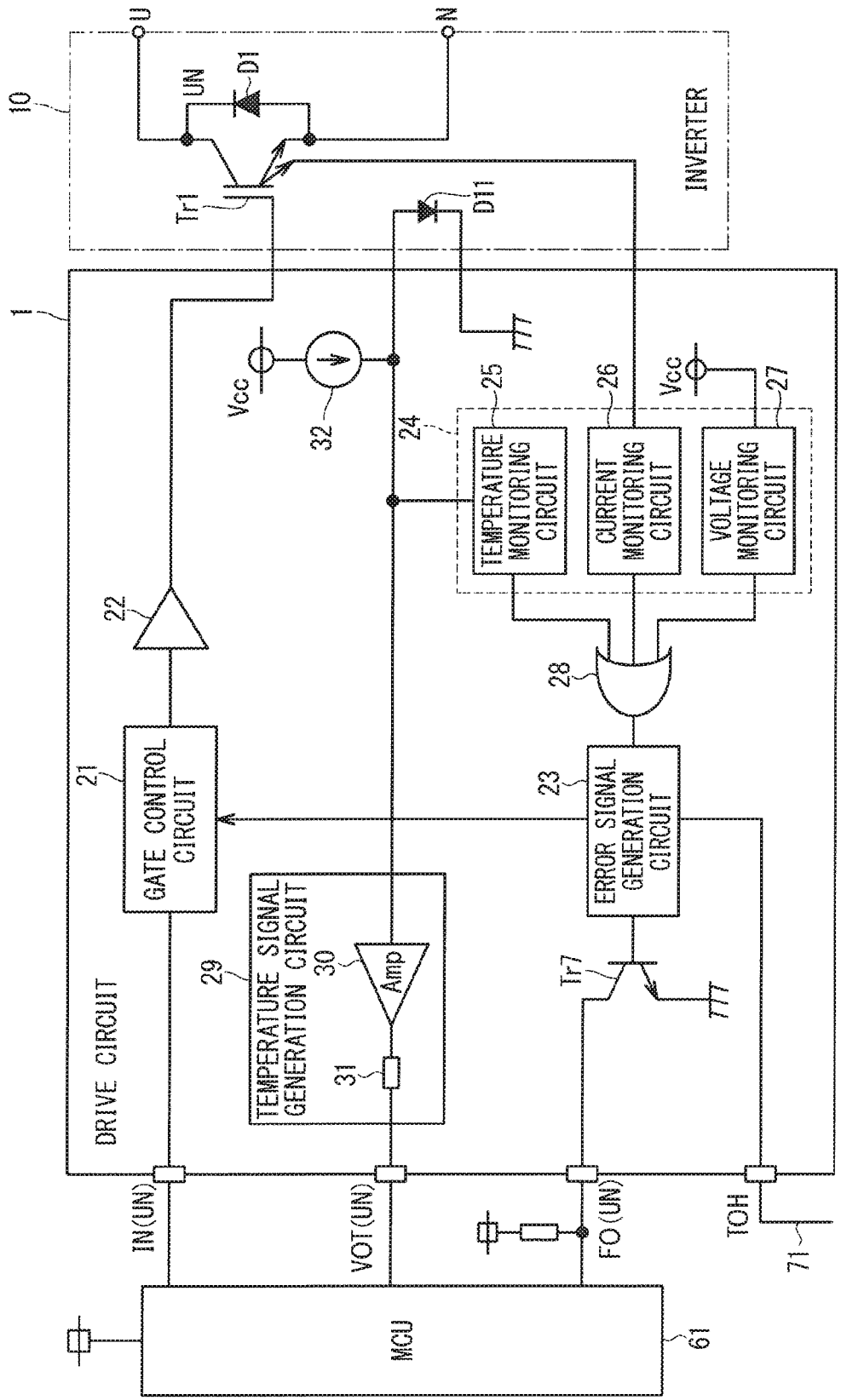
FIG. 2 is a configuration diagram illustrating a drive circuit of the underlying technique.

FIG. 2 is a configuration diagram illustrating the drive circuit 1 of the UN-phase. FIG. 2 is a representative illustrating the configuration of the drive circuit 1 of the UN-phase, since the configurations of the drive circuits 1 to 6 are similar. The drive circuit 1 includes a gate control circuit 21, a gate drive circuit 22, an error signal generation circuit 23, a protection circuit 24, an OR gate 28, an output transistor Tr7, a temperature signal generation circuit 29, and a constant current source 32. The drive circuit 1 also includes an input terminal IN (UN) to which a control signal is input from a Micro Controller Unit (MCU) 61, an output terminal VOT (UN) for temperature information, and an output terminal Fo(UN) for an error signal.

In FIG. 2, the MCU 61 is an example of an inverter control unit outside the IPM 100. The gate control circuit 21 acquires a control signal from the MCU 61, causes the gate drive circuit 22 to operate according to the control signal to control on/off of the gate of the IGBT Tr1. Also, the gate control circuit 21 acquires a protection signal from the error signal generation circuit 23. Specifically, when the protection signal is off, the gate control circuit 21 controls on/off of the IGBT Tr1 according to the control signal, however, when the protection signal is on, the gate control circuit 21 ignores the control signal to stop the driving the IGBT Tr1 and protect the IGBT Tr1 from abnormal state.

The protection circuit 24 detects an abnormality in the IGBT Tr1 which is the semiconductor element in the subject phase. In FIG. 2, the protection circuit 24 includes a temperature monitoring circuit 25, a current monitoring circuit 26, and a voltage monitoring circuit 27. And the circuits are an example of the protection circuit 24. Inclusion of at least one of the temperature monitoring circuit 25, the current monitoring circuit 26, and the voltage monitoring circuit 27 suffices the protection circuit 24. The temperature monitoring circuit 25 detects the temperature of the IGBT Tr1 and outputs an abnormality detection signal of overheat to the OR gate 28 when the temperature is higher than a predetermined threshold. The current monitoring circuit 26 detects a current flowing through the IGBT Tr1 and outputs an abnormality detection signal of overcurrent to the OR gate 28 when the current is higher than a predetermined threshold. The voltage monitoring circuit 27 detects the control voltage applied to the IGBT Tr1, and outputs an abnormality detection signal of control voltage drop to the OR gate 28 when the control voltage is lower than a predetermined threshold.

These abnormality detection signals are low level signals. And, when at least any of the overheat, the overcurrent, and the control voltage drop occurs in the IGBT Tr1, a low level signal is input from the protection circuit 24 to the error signal generation circuit 23 through the OR gate 28. When the low level signal is input, the error signal generation circuit 23 outputs a protection signal to the gate control circuit 21 for a certain time period. The protection signal is also applied to the drive circuits 2 and 3 of the other phases through an electrical connection such a wire or a pattern. As a result, not only the IGBT Tr1 but also the IGBTs Tr2 and Tr3 are prohibited from being driven. An electrical connection is provided between the drive circuits 1 to 3 for transmitting and receiving the protection signal, which is shown as a connection line 71 in FIG. 1 and an input/output terminal $T_{OH}$ in FIG. 2. Note that, the wiring for transmitting and receiving the protection signal provided between the drive circuits 4 to 6 is not shown in FIG. 1.

The error signal generation circuit 23 outputs the protection signal to the gate control circuit 21 for a certain time period after acquiring the protection signal from the drive circuits 2 and 3 of the other phases through the input/output terminal $T_{OH}$.

The error signal generation circuit 23 generates an error signal when the low level signal is input therein. The pulse width or pulse interval of the abnormality detection signal of the protection circuit 24 is different depending on the type of abnormality, and the error signal generation circuit 23 generates an error signal having the pulse width or pulse interval corresponding to the abnormality detection signal. The error signal is output from the error signal generation circuit 23 to the MCU 61 via the output transistor Tr7. The MCU 61 can distinguish abnormal states by the pulse width or pulse interval of the error signal.

Generally, a semiconductor element having temperature dependency is used as a temperature detection element for detecting the element temperature of the semiconductor element. In FIG. 2, a diode D11 is used as a temperature detection element. The diode D11 detects a voltage corresponding to the detection element temperature. The diode D1 is preferably mounted on or near the IGBT Tr1 to be subjected to temperature detection, and detects a voltage according to the temperature at the mounting position. The temperature signal generation circuit 29 including an amplifier 30 and a resistor 31 amplifies or inverts the detection voltage of the diode D11 to generate an analog voltage according to the element temperature at which the MCU 61 perform monitoring in an optimal manner.

The analog voltage generated by the temperature signal generation circuit 29 is output from the output terminal VOT (UN) to the MCU 61 as temperature information. As described above, the drive circuit 1 has the dedicated output terminal VOT (UN) for outputting the temperature information; therefore, the increase in the number of output terminals leads to an increase in size and cost. On the other hand, Japanese Patent Application Laid-Open No. 2014-93903 proposes that a Pulse Width Modulation (PWM) signal that correlates with the element temperature is output during normal time and an alarm signal is output when an abnormality occurs. Thereby, an alarm signal representing element temperature information or an abnormal state is selectively output from the alarm terminal as a digital signal. In this case, the output terminal can be shared by the element temperature information and the alarm signal; therefore, the element temperature information can be output without increasing the number of output terminals.

And, in a case where the temperatures of a plurality of semiconductor elements are individually detected by using a temperature detection element and externally output, the problem arises in that the number of output terminals of the semiconductor device increases, and the processing load of the inverter control unit increases. Therefore, it has been proposed that the temperatures of a plurality of semiconductor elements are individually detected, and the highest temperature information among the temperature information is selected and externally output.

In order for the IPM of the related art to constantly monitor the temperature of the semiconductor device, provision of a dedicated terminal is required to externally output an analog voltage according to the element temperature. Accordingly, there has been a problem that the increase in the number of output terminals leads to the increase in size and cost of the semiconductor device. In addition, the number of output terminals differs from that of IPMs that do not output the temperature information; therefore, in the final product, there has also been a problem that parts such as an external control board or a heat sink are not commonized, leading to increase in cost from the viewpoint of management cost.

On the other hand, as disclosed in Japanese Patent Application Laid-Open No. 2014-93903, a method has been proposed which can output element temperature information without increasing the number of output terminals of the semiconductor device by sharing an output terminal between the temperature information and an abnormal state. In a case where the alarm signal is provided with information on the time axis direction such as pulse width or PWM signal, high information accuracy is ensured for a generation means, and the temperature information can be output at a reasonable cost without increasing the number of output terminals of the semiconductor device. However, when the inverter control unit of the final product reads the temperature information from the alarm signal, it is necessary to perform compare operation on the signal contents of during a certain time period, which requires processing time and calculation load. Specifically, it is required for the inverter control unit to store an alarm signal for a certain period, determine, from the signal interval, whether the alarm signal indicates the temperature information or an abnormal state, and in the case of the temperature information, detect the duty ratio of the signal and convert the duty ratio to corresponding the temperature information. When the alarm signal indicates an abnormal state, the inverter control unit is required to stop the drive signal from being applied to the semiconductor device as soon as possible to secure the safety of the semiconductor device or the inverter. When the protection circuit built in the semiconductor device operates, the protection signal is applied to the gate control circuit for a certain period, and during that time, the semiconductor device does not receive the drive signal and prohibits the switching operation, thereby protection of the semiconductor device from an one-off abnormal state such as an erroneous signal is ensured. On the other hand, the protection state is often released after a certain period. Therefore, for example, when an inter-phase short circuit or the like occurs in a motor, after an overcurrent occurs in the semiconductor element, the inverter control unit detects an abnormal state and stops the operation of the semiconductor element. And then, the protection state is released, the operation of the semiconductor element is recovered, and an overcurrent occurs again. As described above, when the semiconductor element repeats the short circuit state, the element temperature sharply rises and destruction of the semiconductor element or the entire inverter is likely. Therefore, it is desirable to recover the inverter device after solving causes such as elimination of an inter-phase short circuit state.

However, when the alarm signal has information on the direction of the time axis such as pulse width or PWM signal, the detection of the alarm content requires the signal content (log) for a fixed time period, and it takes some time for the inverter control unit to stop after the semiconductor device outputs the alarm signal. And a drive signal is continuously applied to the semiconductor element during that time; therefore, there has been a problem that the failure probability of the semiconductor element or the inverter is increased. Therefore, in following Embodiments, a semiconductor device will be described which can clearly distinguish the element temperature of the semiconductor element from the error signal and output the element temperature by using the output terminal of the error signal.

B. Embodiment 1

Figure 3:
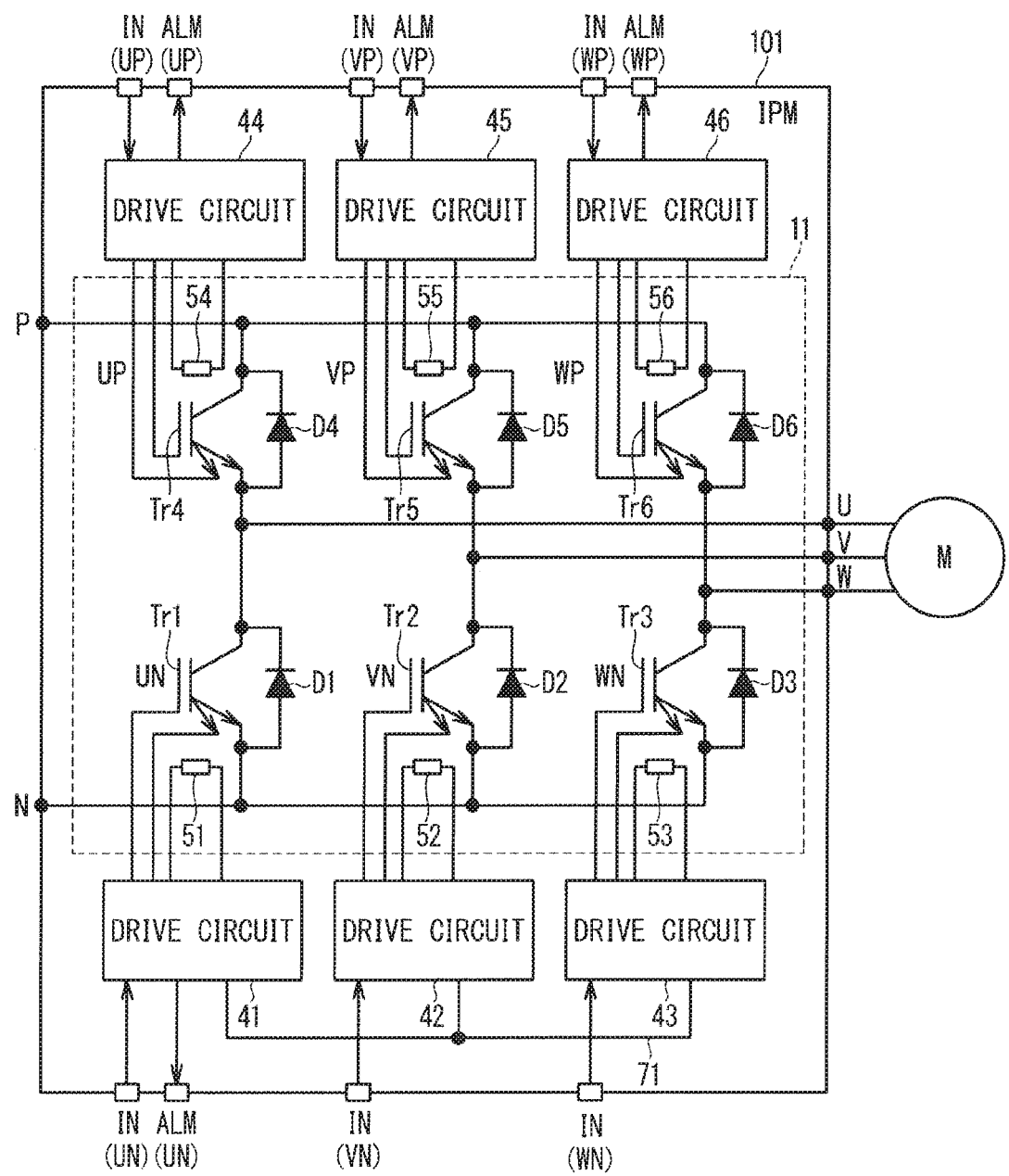
FIG. 3 is a configuration diagram illustrating an IPM of Embodiment 1.

FIG. 3 is a block diagram illustrating a schematic configuration of an IPM 101 of Embodiment 1. Compared to the IPM 100, the IPM 101 includes an inverter 11 instead of the inverter 10, and drive circuits 41 to 46 instead of the drive circuits 1 to 6. The inverter 11 is the same as the inverter 10 of the underlying technique except that temperature detection elements 51 to 56 are included instead of the diodes D11 to D16.

Figure 4:
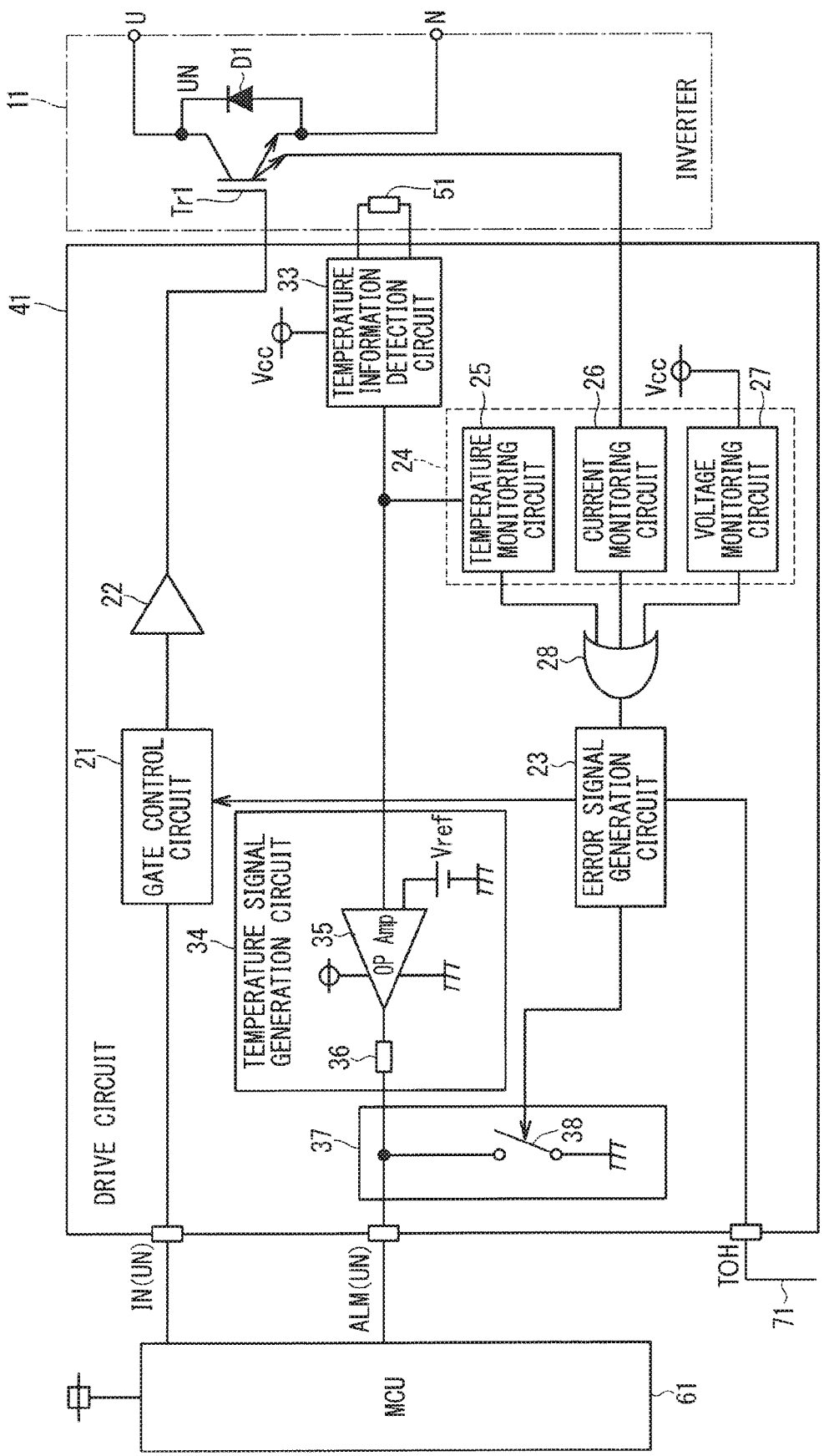
FIG. 4 is a configuration diagram illustrating a drive circuit of Embodiment 1.

FIG. 4 is block diagram illustrating a configuration of the drive circuit 41 of the UN-phase. In the IPM 101, FIG. 4 is a representative illustrating the configuration of the drive circuit 41, since the configurations of the drive circuits 41 to 46 are similar. The drive circuit 41 includes a gate control circuit 21, a gate drive circuit 22, an error signal generation circuit 23, a protection circuit 24, an OR gate 28, a temperature information detection circuit 33, a temperature signal generation circuit 34, and an output control circuit 37.

The temperature detection element 51 is mounted on or near the IGBT Tr1 which is the semiconductor element in the subject phase, and outputs a voltage according to the temperature at the mounting position. The temperature information detection circuit 33 detects the output voltage of the temperature detection element 51 to detect the temperature at or near the IGBT Tr1. Hereinafter, the detection temperature of the temperature information detection circuit 33 is referred to as a detection element temperature.

The temperature signal generation circuit 34 including an operational amplifier 35 and a resistor 36 amplifies or inverts the detection voltage of the temperature information detection circuit 33 to output a temperature signal of a voltage value according to the detection voltage. That is, the temperature signal generation circuit 34 outputs a temperature signal of a voltage value according to the element temperature of the IGBT Tr1 which is a semiconductor element in the subject phase. Assuming that the semiconductor element of the subject phase is a specific semiconductor element for the temperature signal generation circuit 34 of the drive circuit 41 of the UN-phase among the semiconductor elements of a plurality of phases included in the IPM 101, the temperature signal generation circuit 34 outputs the temperature signal of a voltage value according to an element temperature of the specific semiconductor element. Here, the polarity of the operational amplifier 35 does not matter. Preferably, the temperature signal generation circuit 34 adds a specified voltage Vref to the detection voltage of the temperature information detection circuit 33 to generate a temperature signal.

Figure 5:
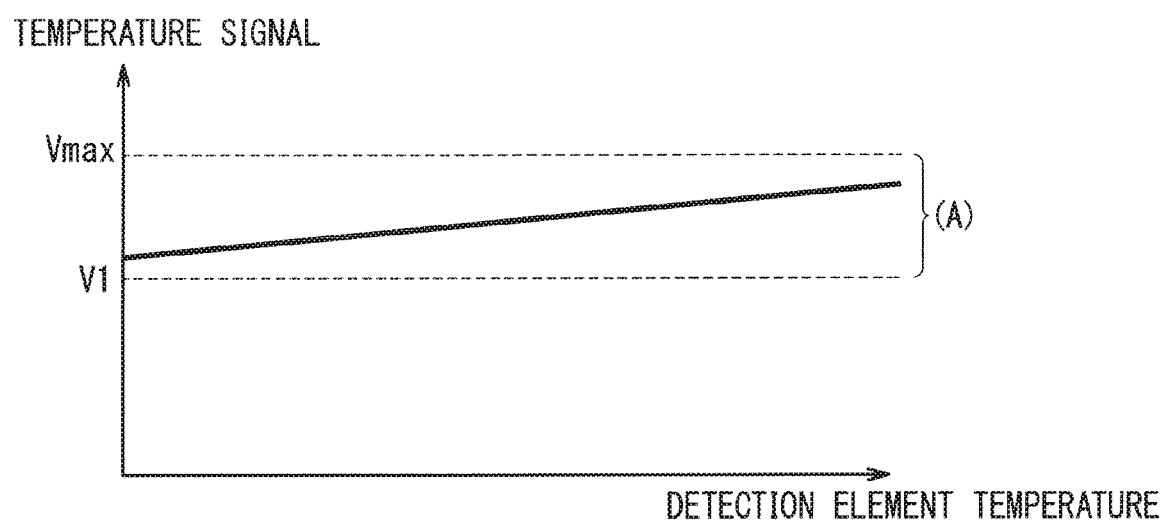
FIG. 5 is a graph illustrating a relationship between a temperature signal and a detection element temperature of Embodiment 1.

FIG. 5 is a graph illustrating a relationship between a detection element temperature and a temperature signal. As the detection element temperature becomes high, the temperature signal becomes larger. The Vref to be added to the detection voltage of the temperature information detection circuit 33 in the temperature signal generation circuit 34 is set so that the voltage value of the temperature signal falls within a voltage range (A) between V1 and Vmax, as shown in FIG. 5. Here, V1 represents the lower limit value of the input voltage at which the MCU 61 recognizes that the alarm signal is normal, that is, an input threshold voltage, and a Vmax is the maximum value Vmax of the input voltage of the MCU 61. The voltage range (A) is a voltage range different from the voltage value of the error signal described later. In other words, the temperature signal generation circuit 34 changes the voltage value of the temperature signal in accordance with the detection element temperature within the voltage range (A) different from the voltage value of the error signal.

The output control circuit 37 receives an output signal of the temperature signal generation circuit 34 and an output signal of the error signal generation circuit 23. The output control circuit 37 selects one of the output signals by the switch 38 and outputs the signal as an alarm signal from the output terminal ALM (UN) to the MCU 61. Specifically, during normal time, that is, during which time the protection circuit 24 does not detect an abnormality and the error signal generation circuit 23 does not output an error signal, the switch 38 is turned off and the output control circuit 37 selects the temperature signal as an alarm signal and output thereof. That is, a temperature signal having a voltage value in the voltage range (A) shown in FIG. 5 is output as an alarm signal.

On the other hand, while the error signal generation circuit 23 is generating an error signal, the switch 38 is turned on, and the output control circuit 37 selects and outputs the error signal as an alarm signal. That is, an error signal of low level, for example, 0 V, is output as an alarm signal.

Therefore, the MCU 61 can determine whether the alarm signal is a temperature signal or an error signal from the voltage value of the alarm signal. That is, the MCU 61 can determine that the alarm signal having the voltage value in the voltage range (A) is a temperature signal, and determine the alarm signal other than that signal as an error signal. It should be noted that the voltage range (A) is determined depending on the MCU 61 connected to the IPM 101. The drive voltage of the MCU 61 is generally 5 V, and the input threshold voltage is set to about 80% of the drive voltage to avoid malfunction. Therefore, the voltage range (A) may be, for example, a range of the drive voltage 5 V of the MCU 61 to the input threshold voltage 4 V of the MCU 61. Meanwhile, when an alarm signal is input to the MCU 61 via a comparator or the like, or a microcomputer with multistage resolutions with built-in comparators is adopted as an input part of the MCU 61, the MCU 61 can arbitrarily set the input threshold. Therefore, in this case, for example, the range of the drive voltage of 5 V to 0.5 V may be the voltage range (A).

Figure 6:
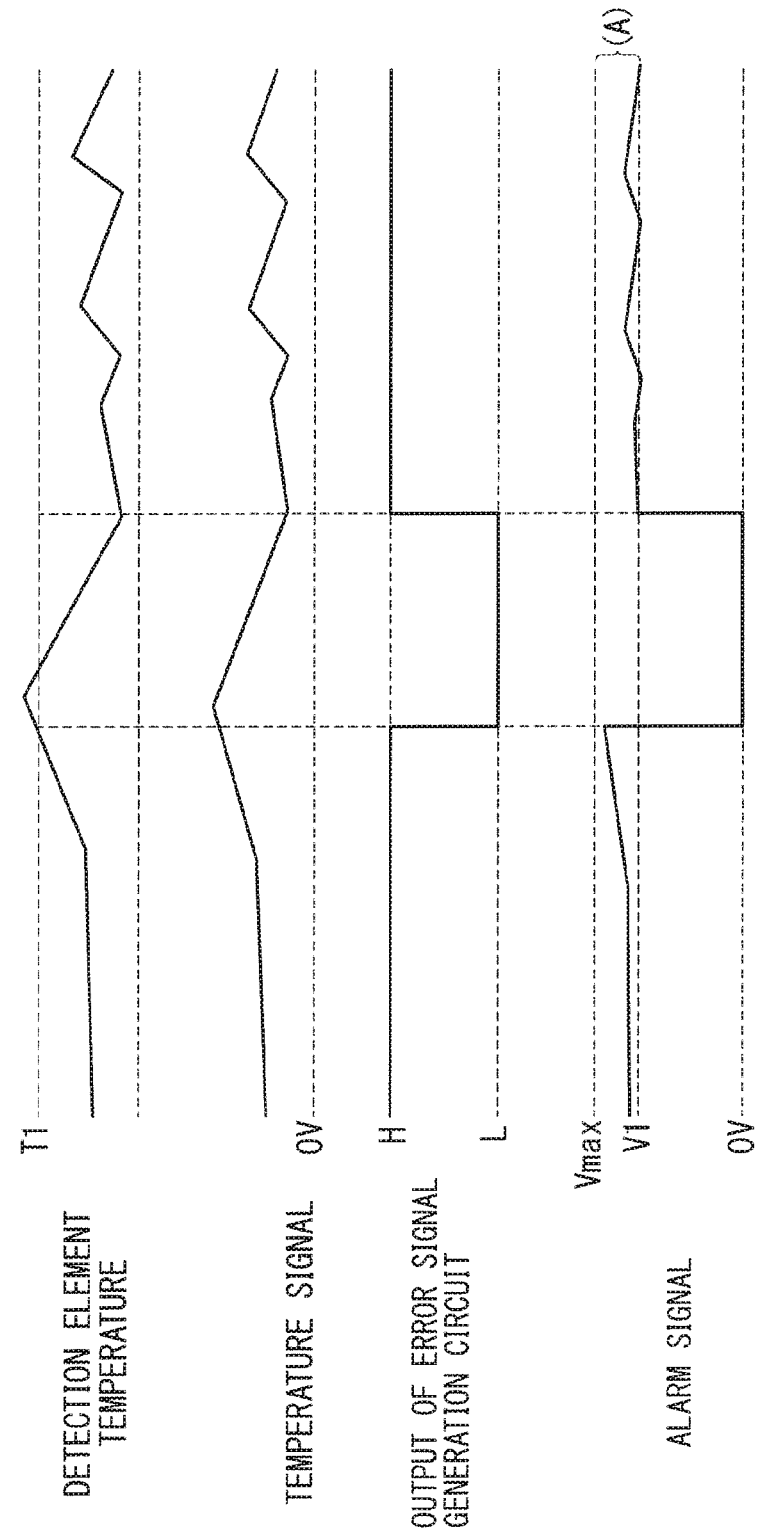
FIG. 6 is a graph illustrating a relationship between the detection element temperature and an alarm signal of Embodiment 1.

FIG. 6 illustrates a relationship between the element temperature, the temperature signal, the output of the error signal generation circuit 23, and the alarm signal in the IPM 101. The operation of the IPM 101 will be described below with reference to FIG. 6. When the element temperature is equal to or lower than a overheat protection trip temperature T1, the output of the error signal generation circuit 23 is at the high level. At this point, the output control circuit 37 outputs a temperature signal as an alarm signal. When the element temperature exceeds the overheat protection trip temperature T1, the temperature monitoring circuit 25 outputs an abnormality detection signal, and the error signal generation circuit 23 outputs an error signal. That is, the error signal generation circuit 23 outputs a low level. While the error signal is being output, the output control circuit 37 selects the error signal instead of the temperature signal and outputs the error signal as an alarm signal. The error signal generation circuit 23 terminates the output of the error signal after a certain time period or when the protection state is released. That is, the output of the error signal generation circuit 23 returns to a high level. When the output of the error signal is terminated, the output control circuit 37 outputs a temperature signal as an alarm signal again.

The IPM 101 of Embodiment 1 includes the IGBTs Tr1 to Tr6 that are semiconductor elements of a plurality of phases, drive circuits 41 to 46 for a plurality of phases for driving the IGBTs Tr1 to Tr6, and a plurality of temperature detection elements 51 to 56 for detecting the element temperatures of the IGBTs Tr1 to Tr6, respectively. And each of the drive circuits 41 to 46 includes a gate control circuit 21 for controlling an input to a gate terminal of each of the IGBTs Tr1 to Tr6 in respective subject phases, a protection circuit 24 for detecting an abnormality of each of the IGBTs Tr1 to Tr6 in respective subject phases, an error signal generation circuit 23 for outputting the error signal when the protection circuit 24 detects an abnormality, a temperature signal generation circuit 34 for generating a temperature signal of a voltage value according to an element temperature of a semiconductor element in a subject phase, and an output control circuit 37 that selects the error signal while the error signal generation circuit 23 outputs the error signal, selects a temperature signal while the error signal generation circuit 23 does not output the error signal, and outputs the selected signal as an alarm signal. The temperature signal generation circuit 34 changes the voltage value of the temperature signal in accordance with the element temperature of the semiconductor element in the subject phase within a voltage range different from the voltage value of the error signal.

According to the above configuration, the IPM 101 shares an output terminal between the error signal and the temperature signal; therefore, there is no need to newly provide an output terminal for outputting the element temperature as an analog signal, and the package of IPM of the related art can be adopted.

And whether the alarm signal is an error signal or a temperature signal is distinguished by the output voltage of the alarm signal. Specifically, the error signal is a low level signal and the voltage value thereof is zero, for example. Meanwhile, the voltage value of the temperature signal is in the voltage range (A) between V1 and Vmax. When the temperature signal is an alarm signal, the voltage value of the alarm signal takes a value corresponding to the element temperature of the semiconductor element in the voltage range (A). In other words, temperature information is superimposed on the alarm signal.

Therefore, by processing the alarm signal as a digital signal in a conventional manner, the MCU 61 can ignore the temperature information superimposed on the alarm signal, extract only the error signal, and detect an abnormal state. As described above, the IPM 101 of Embodiment 1 operates without problems even with an MCU based on the IPM of the related art having no output function for temperature signal and thus the IPM 101 has compatibility with the IPM of the related art. Therefore, reduction in the types of IPMs required not only at the time of inverter assembly but also at the time of IPM replacement at a market failure, or the like is ensured, and shortening of operation time or compression of management cost can be expected.

Further, the MCU 61 can continuously check the element temperature of the IGBT Tr1 by adding a circuit that applies analog signal processing to an alarm signal N_ALM. And, when the element temperature of the IGBT Tr1 exceeds the set value, the MCU 61 outputs, to the drive circuit 41, a control signal for limiting the drive signal of the IGBT Tr1. Thus, the drive signal to the IGBT Tr1 is interrupted, and the safety and the long life of the IPM 101 are realized.

In the IPM 101, the output terminal is shared between the temperature signal and the error signal which is in common with the technology described in Japanese Patent Application Laid-Open No. 2014-93903. However, in the technology of Japanese Patent Application Laid-Open No. 2014-93903, the alarm signal has information on the time axis direction such as pulse width or PWM signal; therefore, even if the output of the alarm signal is 0 V (L state), it is not necessarily an abnormal state. And the determination of the content of the alarm signal requires the content of the signal (log) for a certain time period. Therefore, it takes time for the inverter control unit to stop after the IPM outputs an alarm signal, and the drive signal continues to be applied to the IPM during that time, and there has been a problem that the failure probability of the semiconductor element or the inverter is increased. Also, a certain processing time is required to recognize the temperature information. Meanwhile, according to the IPM 101, when the alarm signal is 0 V (L state), it is limited to the abnormal state in which the protection function is operated, and the abnormal state can be swiftly determined in the inverter control unit.

C. Embodiment 2

Figure 7:
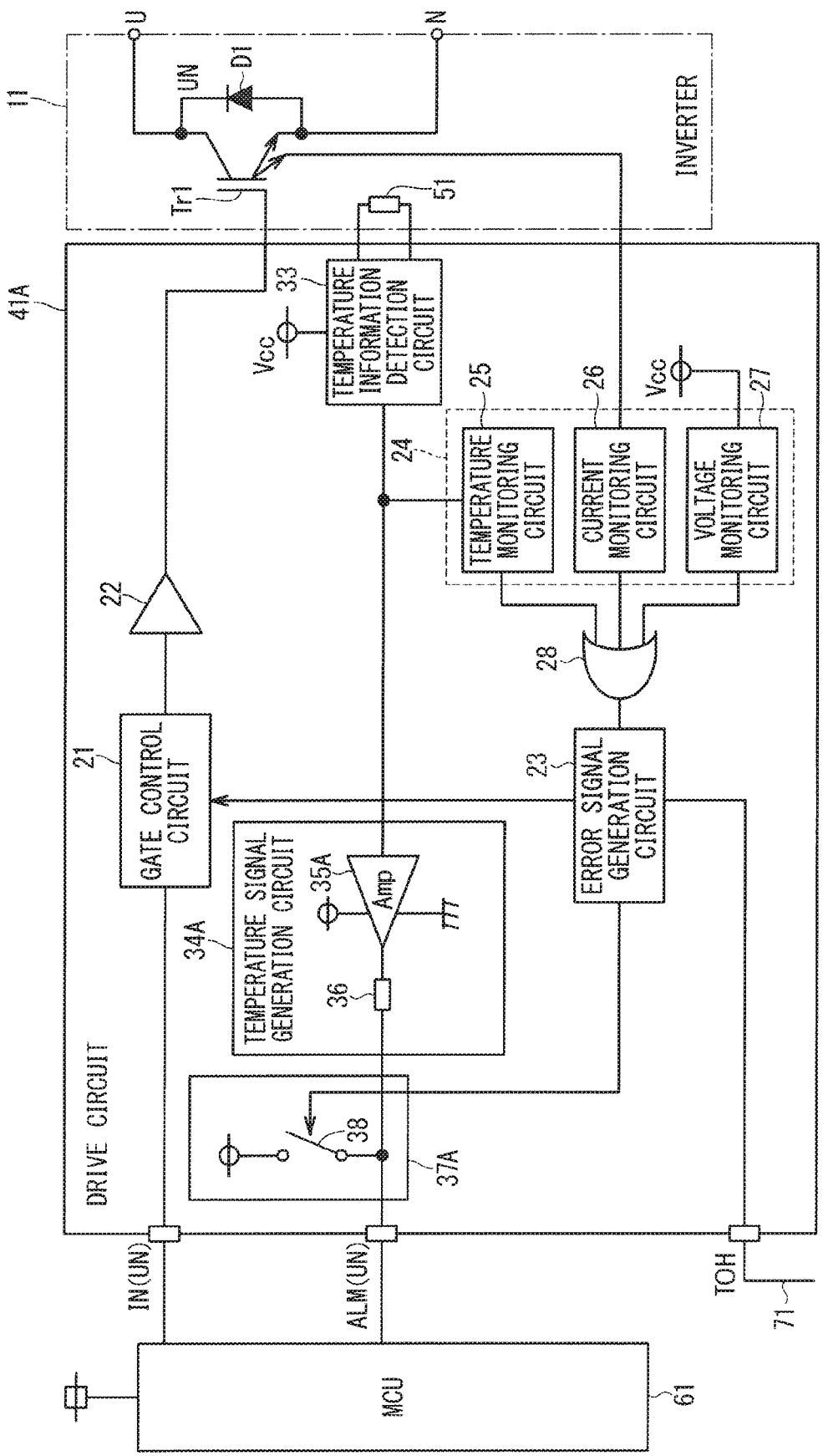
FIG. 7 is a configuration diagram illustrating a drive circuit of Embodiment 2.

FIG. 7 is a block diagram illustrating a configuration of a drive circuit 41A of the UN-phase in an IPM of Embodiment 2. The IPM of Embodiment 2 is a modification of the configuration of the drive circuit in the IPM 101 of Embodiment 1 illustrated in FIG. 3. In the IPM of Embodiment 2, FIG. 7 is a representative illustrating the configuration of the drive circuit 41A of the UN-phase, since the configurations of all drive circuits for each phase are similar.

As shown in FIG. 7, in comparison with the drive circuit 41 of Embodiment 1, the drive circuit 41A includes a temperature signal generation circuit 34A instead of the temperature signal generation circuit 34, and an output control circuit 37A instead of the output control circuit 37. The temperature signal generation circuit 34A includes an amplifier 35A and a resistor 36. Unlike the operational amplifier 35 of the temperature signal generation circuit 34 of Embodiment 1, the amplifier of the temperature signal generation circuit 34A does not add the voltage Vref to the detection voltage of the temperature information detection circuit 33 when generating a temperature signal. Therefore, the temperature signal generated by the temperature signal generation circuit 34A is low level.

When an error signal is input from the error signal generation circuit 23 to the output control circuit 37A, the switch 38 is turned on, and a high level alarm signal is output from an output terminal ALM (UN). Meanwhile, when the output signal of the error signal generation circuit 23 is high level, the switch 38 is turned off, and a low level temperature signal which is the output of the temperature signal generation circuit 34A is output as an alarm signal from the output terminal ALM (UN). Therefore, in the IPM of Embodiment 2, the output voltage of the alarm signal at the time of abnormality representing an error signal is high level, whilst the output voltage of the alarm signal at normal time representing a temperature signal is low level; accordingly, the polarity of the alarm signal is inverted from that of the IPM 101 of Embodiment 1.

D. Embodiment 3

Figure 8:
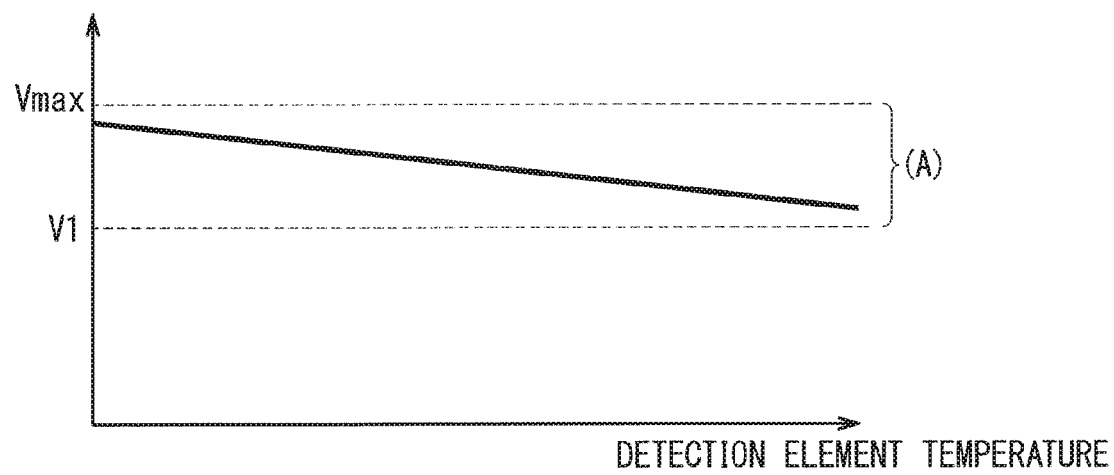
FIG. 8 is a graph illustrating a relationship between a temperature signal and a detection element temperature of Embodiment 3.

The configurations of the IPM and the drive circuit of Embodiment 3 are the same as the configurations of the IPM 101 and the drive circuit 41 of Embodiment 1 illustrated in FIGS. 3 and 4. In the IPM 101 of Embodiment 1, as illustrated in FIG. 5, the temperature signal has positive temperature dependency with respect to the detection element temperature. Whereas in the IPM of Embodiment 3, as illustrated in FIG. 8, the temperature signal has negative temperature dependency with respect to the detection element temperature. That is, in the drive circuit of Embodiment 3, the temperature signal generation circuit 34 reduces the voltage value of the temperature signal as the detection element temperature is higher.

Figure 9:
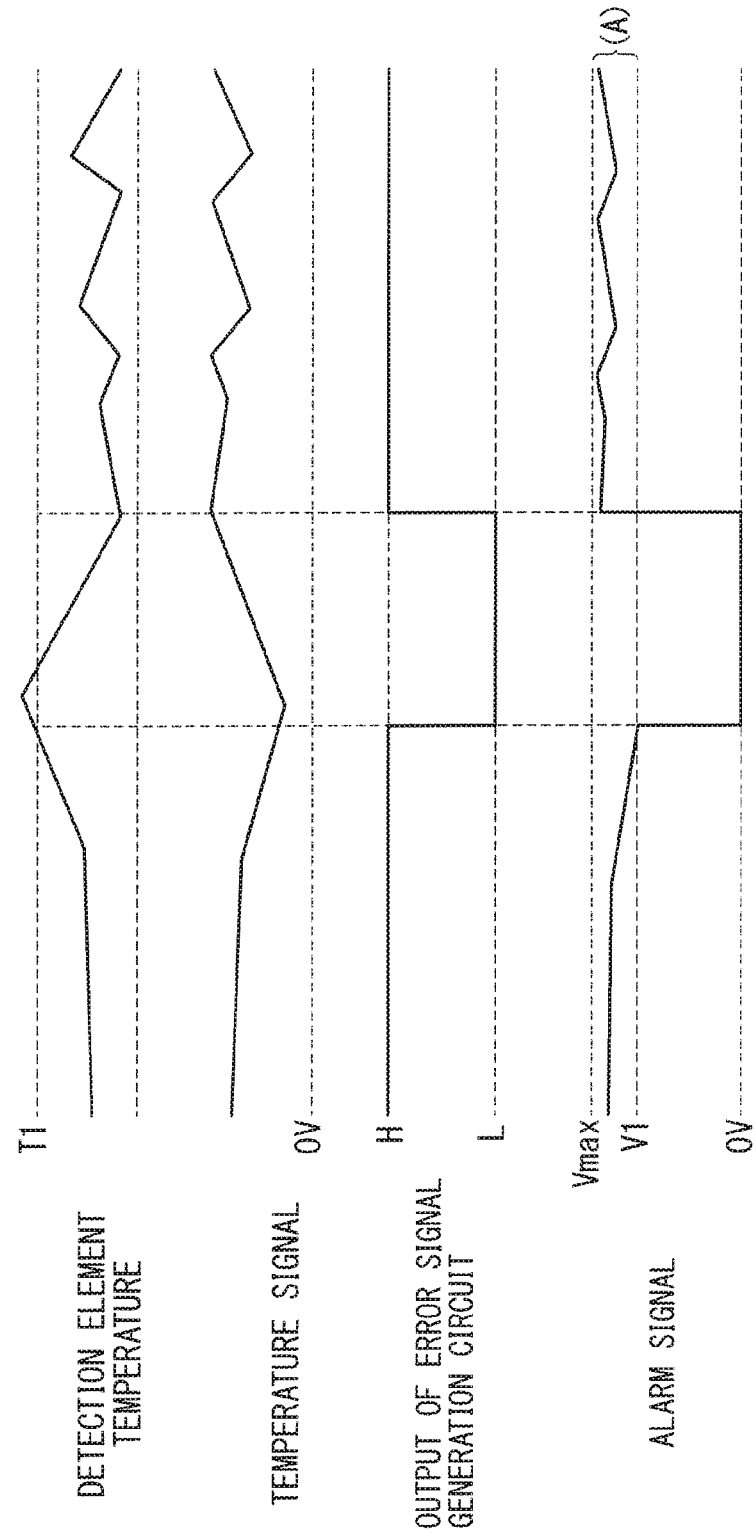
FIG. 9 is a graph illustrating a relationship between the detection element temperature and an alarm signal of Embodiment 3.

FIG. 9 illustrates a relationship between an element temperature, a temperature signal, an output of the error signal generation circuit 23, and an alarm signal of Embodiment 3. As the temperature signal has the negative temperature dependency, during normal time, the lower the detection element temperature, the higher the alarm signal, and the higher the detection element temperature, the lower the alarm signal, and thus, the alarm signal approaches closer to the input threshold of the MCU 61.

Therefore, when the voltage value of the alarm signal is in the vicinity of the input threshold voltage V1, the risk that the MCU 61 erroneously determines that the alarm signal representing the temperature signal is an error signal can be reduced.

E. Embodiment 4

Figure 10:
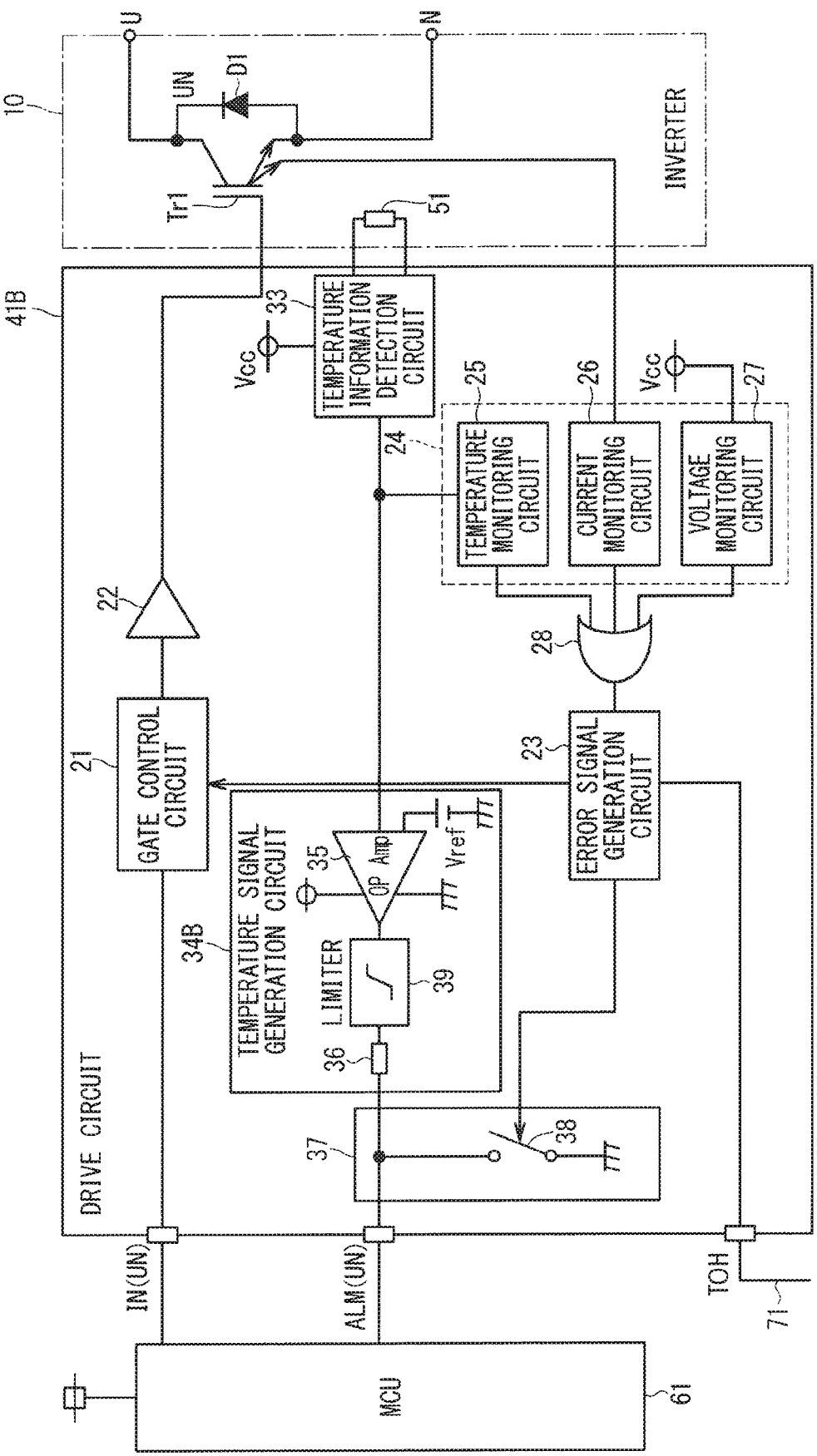
FIG. 10 is a configuration diagram illustrating a drive circuit of Embodiment 4.

FIG. 10 is a block diagram illustrating a configuration of a drive circuit 41B of the UN-phase in an IPM of Embodiment 4. The configuration of the IPM of Embodiment 4 is the same as the configuration of the IPM 101 of Embodiment 1 illustrated in FIG. 3. In the IPM of Embodiment 4, FIG. 10 is a representative illustrating the configuration of the drive circuit 41B of the UN-phase, since the configurations of all drive circuits for each phase are similar.

In comparison with the drive circuit 41 of Embodiment 1, the drive circuit 41B includes a temperature signal generation circuit 34B instead of the temperature signal generation circuit 34. Except for the temperature signal generation circuit 34B, the configuration of the drive circuit 41B is the same as that of the drive circuit 41. In comparison with the configuration of the temperature signal generation circuit 34, the temperature signal generation circuit 34B includes a limiter 39 between an operational amplifier 35 and a resistor 36.

Figure 11:
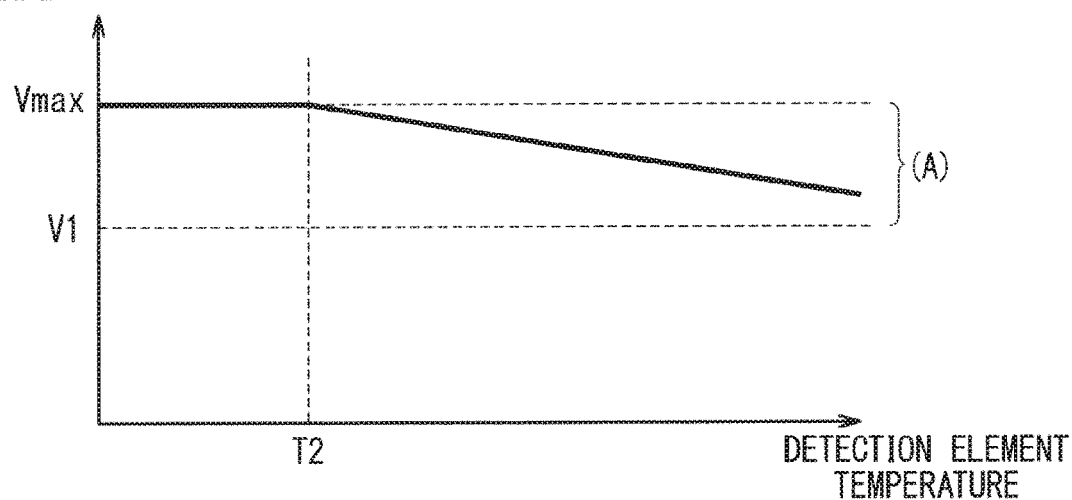
FIG. 11 is a graph illustrating a relationship between a temperature signal and a detection element temperature of Embodiment 4.

The limiter 39 outputs a constant voltage value when an output voltage of the operational amplifier 35 is less than a set value, and outputs a voltage value corresponding to the output voltage of the operational amplifier 35 when the output voltage of the operational amplifier 35 is equal to or greater than the set value. By the operation of the limiter 39, the temperature signal generation circuit 34B outputs a temperature signal illustrated in FIG. 11. FIG. 11 illustrates a relationship between a temperature signal output from the temperature signal generation circuit 34B and a detection element temperature. When the detection element temperature is lower than a set temperature T2, which is a predetermined first temperature, the temperature signal generation circuit 34B sets a voltage indicating a normal state of an alarm signal, for example, Vmax as a voltage value of the temperature signal, and when the detection element temperature is equal to or higher than the set temperature T2, the temperature signal generation circuit 34B changes the voltage value of the temperature signal according to the detection element temperature. The set temperature T2 is equal to or higher than the normal temperature and equal to or lower than an overheat protection trip temperature T1. In other words, the overheat protection trip temperature T1 is a second temperature higher than the first temperature.

Generally, the junction temperature of the semiconductor device is specified. For example, the IPM specified at equal to or higher than −30° C. and equal to or lower than 125° C. is necessary to be used under the temperature range; therefore, it is sufficient that the specified bonding temperature range for this is assigned within the voltage range (A). However, in a case where the alarm signal is used for overheat protection, in order for the MCU 61 to detect the element temperature with high accuracy from the alarm signal, the resolution in the voltage range (A) is required to be increased. In this point, according to the drive circuit 41B of Embodiment 4, the range of the junction temperature of the semiconductor element assigned within the voltage range (A) is reduced, so that the resolution in the voltage range (A) is improved. Specifically, assuming that the set temperature T2 is 60° C., for example, the drive circuit 41B according to Embodiment 4 sets the output voltage of the alarm signal to a constant maximum value when the detection element temperature is lower than 60° C., and when the detection element temperature becomes equal to or higher than 60° C., the drive circuit 41B reduces the output voltage of the alarm signal within the voltage range (A) according to the increase of the detection element temperature. That is, the detection element temperature of 60° C. or higher is assigned to the voltage range (A). Thus, the resolution in the voltage range (A) is approximately doubled, and the MCU 61 can detect the element temperature with high accuracy.

Figure 12:
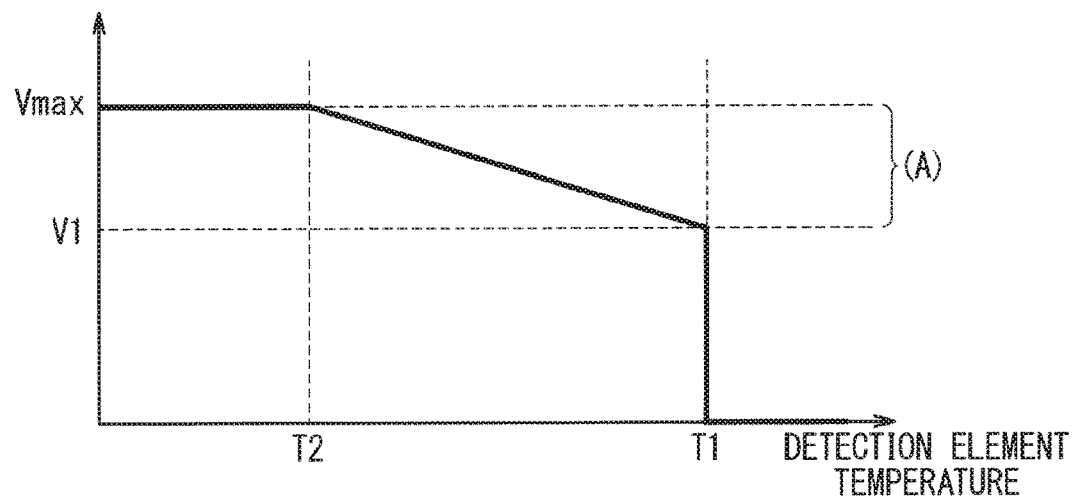
FIG. 12 is a graph illustrating a relationship between a temperature signal and a detection element temperature of Modification 1 of Embodiment 4.

FIG. 12 is a graph illustrating a relationship between a temperature signal and a detection element temperature of Modification 1 of Embodiment 4. As shown in FIG. 12, when the detection element temperature of the IGBT Tr1 becomes equal to or higher than the overheat protection trip temperature T1, the temperature signal generation circuit 34B may set the output voltage of the temperature signal out of the voltage range (A) representing the time of abnormality of the alarm signal to a constant value, for example, 0. Specifically, when the detection element temperature is lower than the set temperature T2 which is the first temperature, the temperature signal generation circuit 34B may set a voltage indicating the normal state of the alarm signal, for example, Vmax as the voltage value of the temperature signal. When the detection element temperature is equal to or higher than the set temperature T2 and lower than the overheat protection trip temperature T1 which is the second temperature, the temperature signal generation circuit 34B may change the voltage value of the temperature signal according to the detection element temperature. The temperature signal generation circuit 34B may set the voltage value of the temperature signal to 0 if the detection element temperature is equal to or higher than the overheat protection trip temperature T1. Therefore, the voltage range (A) of the output voltage of the alarm signal is assigned to the detection element temperature that is equal to or higher than the set temperature T2 and lower than the overheat protection trip temperature T1, so that the resolution in the voltage range (A) is improved further.

In Modification 1, the temperature signal generation circuit 34B fixes a gradient of the temperature signal with respect to the detection element temperature when the detection element temperature is equal to or higher than the set temperature T2 and lower than the overheat protection trip temperature T1. However, the temperature signal generation circuit 34B may set an overheat alarm temperature T3 which is a third temperature between the set temperature T2 and the overheat protection trip temperature T1, and when the detection element temperature is equal to or higher than the overheat alarm temperature T3, the temperature signal generation circuit 34B may set the gradient of the temperature signal with respect to the detection element temperature steeper than that in the case where the detection element temperature is lower than the overheat alarm temperature T3. Such an example is taken as Modification 2 of Embodiment 4.

Figure 13:
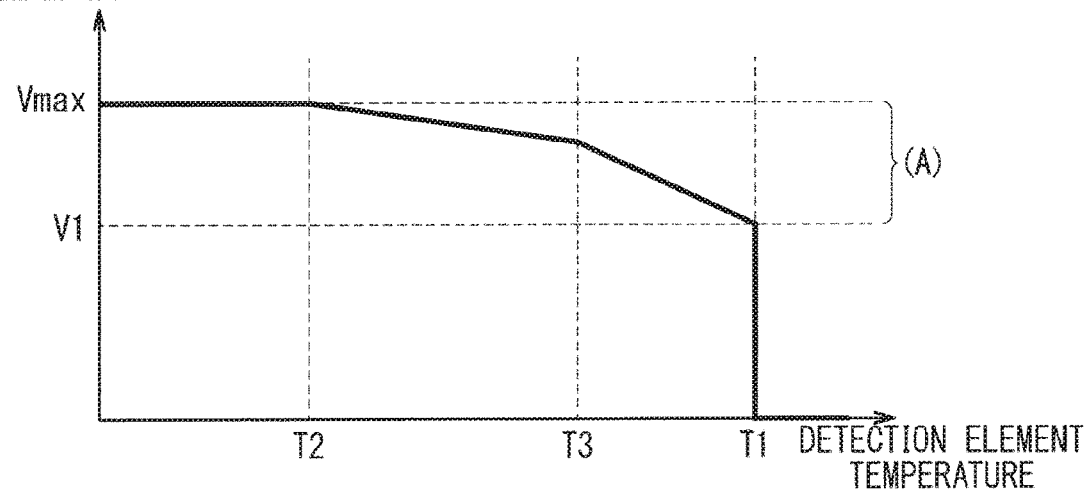
FIG. 13 is a graph illustrating a relationship between a temperature signal and a detection element temperature of Modification 2 of Embodiment 4.

FIG. 13 is a graph illustrating a relationship between a temperature signal and a detection element temperature of Modification 2 of Embodiment 4. The temperature signal when the detection element temperature is lower than the set temperature T2 or equal to or higher than the overheat protection trip temperature T1, such a case is the same as in Modification 1. When the detection element temperature rises from the set temperature T2 to the overheat alarm temperature T3, the voltage value of the temperature signal decreases along a constant gradient, that is, a first gradient. When the detection element temperature rises from the set temperature T3 to the overheat protection trip temperature T1, the voltage value of the temperature signal decreases along a greater gradient, that is, a second gradient.

For example, the set temperature T2 is 60° C., the overheat alarm temperature T3 is 100° C., and the overheat protection trip temperature T1 is 125° C. According to Modification 2, the gradient of the voltage value of the alarm signal with respect to the detection element temperature when the detection element temperature is in the range of 100° C. or higher and lower than 125° C. becomes greater than the gradient of the voltage value of the alarm signal with respect to the detection element temperature when the detection element temperature is in the range of 60° C. or higher and lower than 100° C.

Accordingly, the resolution in the temperature range in which the MCU 61 requires temperature information to perform overheat protection is increased. Therefore, according to Modification 2, an alarm signal that enables the MCU 61 to accurately detect the detected temperature can be output by the IPM within the limited output range.

When the element temperature of the semiconductor element rises, the junctions of the semiconductor element deteriorate and cause a failure of the IPM. Specifically, cracks in the solder material immediately below the chip develop, and the wire bonded to the chip surface peels or breaks. It is generally known that the failure rate of IPM changes exponentially with the device temperature. Therefore, in order to satisfy the designed lifetime of the inverter device, the inverter control unit is required to constantly monitor the temperatures of the semiconductor elements and stop the semiconductor device or limit loads for the inverter device such that the inverter device is used under the prescribed temperature. According to Modification 2 of Embodiment 4, the resolution of the temperature information increases in the range from the overheat alarm temperature T3 to the overheat protection trip temperature T1; therefore, the MCU 61 detects the element temperature in this temperature range with high accuracy. Therefore, the use of the semiconductor element to its limit of the element performance by the MCU 61 can be ensured without losing the life of the IPM.

F. Embodiment 5

In the IPMs of Embodiments 1 to 4, the temperature signal generation circuit in the drive circuit of each phase changes the output voltage of the temperature signal according to the detection element temperature of the IGBT of each phase. Whereas, in Embodiment 5, the detection element temperatures of the IGBTs of each phase are transmitted and received among the plurality of drive circuits, and the temperature signal generation circuit in drive circuit of each phase changes the output voltage of the temperature signal according to the highest temperature of the acquired plurality of detection element temperatures.

FIG. 14 is a configuration diagram illustrating an IPM 105 of Embodiment 5. In comparison with the IPM 101 of Embodiment 1, the IPM 105 includes drive circuits 81 to 86 instead of the drive circuits 41 to 46, and differs in that electrical connections for transmitting and receiving temperature information between the drive circuits of respective phases are established. These electrical connections are realized by wires, patterns, or the like. Specifically, the drive circuit 81 of the UN-phase is connected to the drive circuit 82 of the VN-phase by wiring 72, and is connected to the drive circuit 83 of the WN-phase by wiring 73. The same signal wiring is performed for the drive circuits 84 to 86 of the UP-phase, the VP-phase, and the WP-phase while maintaining mutual electrical insulation, but the illustration thereof is omitted in FIG. 14.

Figure 15:
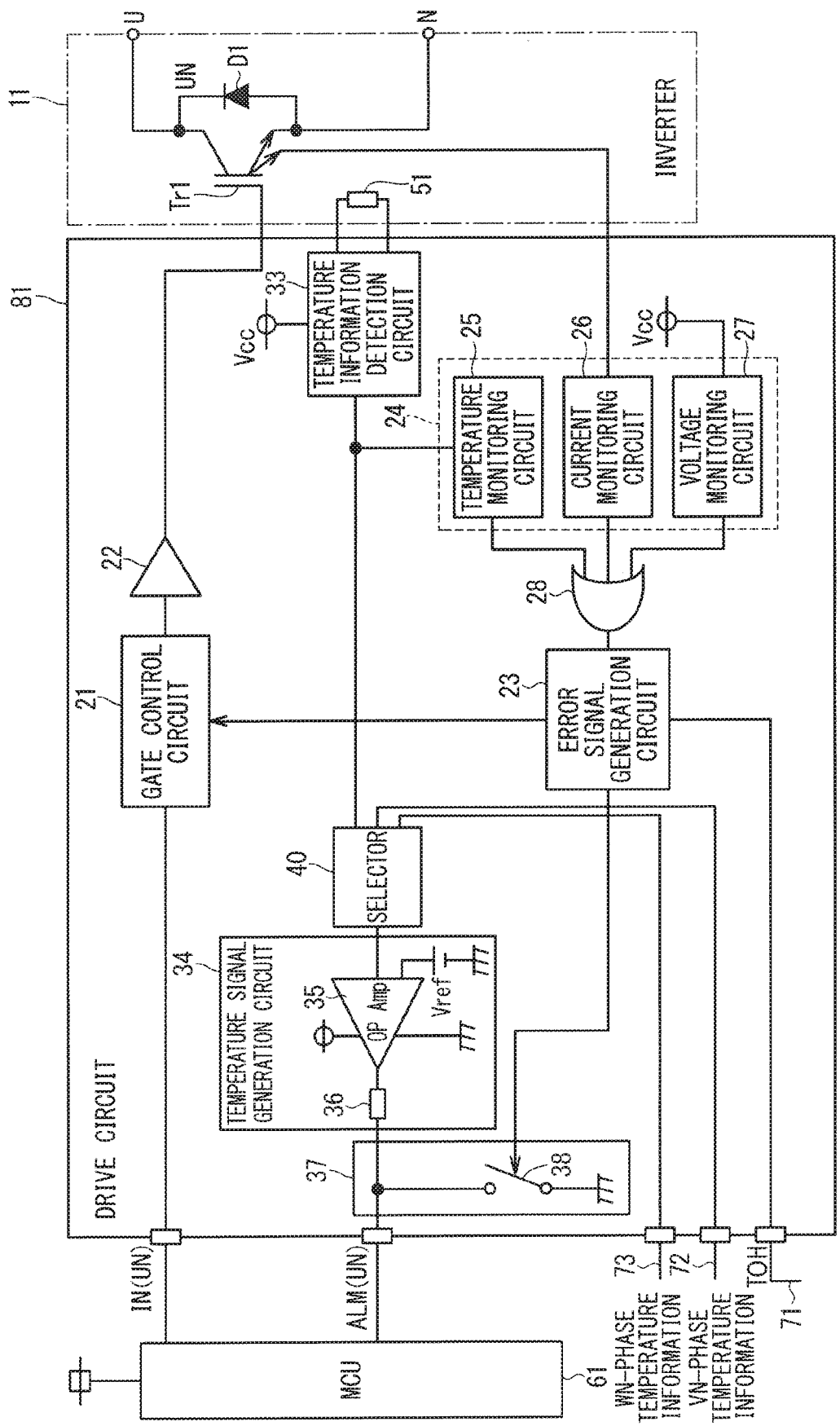
FIG. 15 is a configuration diagram illustrating a drive circuit of Embodiment 5.

FIG. 15 is block diagram illustrating a configuration of the drive circuit 81 of the UN-phase in the IPM 105. FIG. 15 is a representative illustrating the configuration of the drive circuit 81 of the UN-phase, since the configurations of the drive circuits 81 to 86 in the IPM 105 are similar. The driver circuit 81 includes a selector 40 in addition to the configuration of the driver circuit 41 of the IPM 101 of Embodiment 1. The selector 40 is provided between the temperature information detection circuit 33 and the temperature signal generation circuit 34, and acquires the detection element temperature of the IGBT Tr1 of the UN-phase from the temperature information detection circuit 33. Further, the selector 40 acquires information of the detection element temperature of the IGBT Tr2 of the VN-phase from the wiring 72, and acquires information of the detection element temperature of the IGBT Tr3 of the WN-phase from the wiring 73.

The selector 40 performs compare operation between the detection element temperatures of the UN-phase, the VN-phase, and the WN-phase to select the highest temperature, and outputs temperature information of the highest temperature to the temperature signal generation circuit 34. Here, for example, assuming that the detection element temperature of the VN-phase is the highest temperature, the temperature signal generation circuit 34 generates a temperature signal of a voltage value corresponding to the detection element temperature of the IGBT Tr2 of the VN-phase. In other words, it can be said that the selector 40 selects the semiconductor element having the highest element temperature among the semiconductor elements of the UN-phase, the VN-phase, and the WN-phase as a specific semiconductor element, and the temperature signal generation circuit 34 generates the temperature signal of the voltage value corresponding to the detection element temperature.

Here, although the process in the drive circuit 81 of the UN-phase is described, it is sufficient that the above process of selecting the specific semiconductor element by acquiring the element temperature of the semiconductor element from the other phase is performed on the drive circuit of one phase (specific phase) among the UN-phase, VN-phase, and WN-phase.

In Embodiments 1 to 4, the MCU 61 acquires the detection element temperature of each phase as an alarm signal from the drive circuit of each phase. Therefore, the MCU 61 is required to perform compare operation on the detection element temperature of each phase. However, in Embodiment 5, the drive circuits 81 to 86 of each phase output the highest temperature of the detection element temperatures of a plurality of phases to the MCU 61 as an alarm signal. Therefore, the MCU 61 is not required to perform the compare operation on the detection element temperature of each phase, and calculation processing is reduced.

G. Embodiment 6

An IPM of Embodiment 6 has a configuration in which, in the IPM 101 of Embodiment 1, a plurality of drive circuits 41 to 46 are mounted as one integrated circuit in the vicinity of the semiconductor element, and the temperature detection elements 51 to 56 are mounted on or near the surface of the integrated circuit. In the case where the temperature detection elements 51 to 56 are provided on the semiconductor element as on-chip temperature sensors, it is required that a diode for temperature detection is connected to the semiconductor element, a circuit for drawing a wire on a chip and supplying a current for temperature detection is provided, and a dedicated wire pad for energizing the detection diode for temperature detection. As a result, this increases the ineffective area of the semiconductor element, enlarges the size of the semiconductor element, leading to the cost increase.

As the element temperature of the semiconductor element rises, the temperature of the integrated circuit disposed in the vicinity of the semiconductor element also rises. Therefore, by detecting the temperature of the integrated circuit by the temperature detection elements 51 to 56, the element temperature of the semiconductor element can be detected in a simplified manner. As a result, a smaller and more inexpensive IPM is realized.

Although Embodiment 6 has been described above as a modification of the IPM 101 of Embodiment 1, Embodiment 6 is also applicable to the other Embodiments 2 to 5.

It should be noted that Embodiments of the present invention can be arbitrarily combined and can be appropriately modified or omitted without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. An intelligent power module, comprising:
   semiconductor elements of a plurality of phases;
   drive circuits of a plurality of phases configured to drive the semiconductor elements of the plurality of phases; and
   a plurality of temperature detection elements configured to detect respective element temperatures of the semiconductor elements of the plurality of phases,
   each of the drive circuits including
   a gate control circuit configured to control input to a gate terminal of a semiconductor element of the semiconductor elements in a subject phase,
   a protection circuit configured to detect an abnormality of the semiconductor element in the subject phase,
   an error signal generation circuit configured to output an error signal when the protection circuit detects the abnormality,
   a temperature signal generation circuit configured to generate a temperature signal of a voltage value corresponding to an element temperature of a specific semiconductor element which is any one semiconductor element of the semiconductor elements of the plurality of phases, and
   an output control circuit configured to select the error signal while the error signal generation circuit outputs the error signal, to select the temperature signal while the error signal generation circuit does not output the error signal, and to output a selected signal as an alarm signal,
   the temperature signal generation circuit being configured to change the voltage value of the temperature signal in accordance with the element temperature of the specific semiconductor element within a voltage range different from a voltage value of the error signal, wherein
   the temperature signal generation circuit is configured to continuously change the voltage value of the temperature signal according to the element temperature of the specific semiconductor element.

2. The intelligent power module according to claim 1, wherein
   the temperature signal generation circuit is configured to reduce the voltage value of the temperature signal as the element temperature of the specific semiconductor element is higher.

3. The intelligent power module according to claim 1, wherein
   the specific semiconductor element includes a semiconductor element in a subject phase.

4. The intelligent power module according to claim 1, wherein
   the drive circuit in a specific phase further includes a selector configured to acquire information on the element temperature of the semiconductor element of other phases and select a semiconductor element having a highest temperature among the semiconductor elements of the plurality of phases as the specific semiconductor element.

5. An intelligent power module, comprising:
   semiconductor elements of a plurality of phases;
   an integrated circuit including drive circuits of a plurality of phases, the drive circuits being configured to drive the semiconductor elements of the plurality of phases; and
   a plurality of temperature detection elements, each of the drive circuits including
   a gate control circuit configured to control input to a gate terminal of a semiconductor element of the semiconductor elements in a subject phase,
   a protection circuit configured to detect an abnormality of the semiconductor element in the subject phase,
   an error signal generation circuit configured to output an error signal when the protection circuit detects the abnormality,
   a temperature signal generation circuit configured to generate a temperature signal of a voltage value corresponding to an element temperature of the integrated circuit, and
   an output control circuit configured to select the error signal while the error signal generation circuit outputs the error signal, to select the temperature signal while the error signal generation circuit does not output the error signal, and to output a selected signal as an alarm signal, wherein the temperature signal generation circuit is configured to change the voltage value of the temperature signal in accordance with the element temperature of the integrated circuit within a voltage range different from a voltage value of the error signal, the temperature signal generation circuit is configured to continuously change the voltage value of the temperature signal according to the element temperature of the integrated circuit, and the plurality of temperature detection elements is configured to detect an element temperature of the integrated circuit.

6. An intelligent power module, comprising:

semiconductor elements of a plurality of phases;

drive circuits of a plurality of phases configured to drive the semiconductor elements of the plurality of phases; and a plurality of temperature detection elements configured to detect respective element temperatures of the semiconductor elements of the plurality of phases, each of the drive circuits including a gate control circuit configured to control input to a gate terminal a semiconductor element of the semiconductor elements in a subject phase, a protection circuit configured to detect an abnormality of the semiconductor element in the subject phase, an error signal generation circuit configured to output an error signal when the protection circuit detects the abnormality, a temperature signal generation circuit configured to generate a temperature signal of a voltage value corresponding to an element temperature of a specific semiconductor element which is any one semiconductor element of the semiconductor elements of the plurality of phases, and an output control circuit configured to select the error signal while the error signal generation circuit outputs the error signal, to select the temperature signal while the error signal generation circuit does not output the error signal, and to output a selected signal as an alarm signal, the temperature signal generation circuit being configured to change the voltage value of the temperature signal in accordance with the element temperature of the specific semiconductor element within a voltage range different from a voltage value of the error signal, wherein the temperature signal generation circuit is configured to set the voltage value of the temperature signal to a constant value within the voltage range when the element temperature of the specific semiconductor element is lower than a first temperature, and change the voltage value of the temperature signal according to the element temperature of the specific semiconductor element when the element temperature of the specific semiconductor element is equal to or higher than the first temperature, the protection circuit is configured to detect an abnormality of the semiconductor element in the subject phase when the element temperature of the semiconductor element in the subject phase is equal to or higher than a second temperature which is higher than the first temperature, and the temperature signal generation circuit is configured to change the voltage value of the temperature signal according to the element temperature of the specific semiconductor element when the element temperature of the specific semiconductor temperature is equal to or higher than the first temperature and lower than the second temperature, and set the voltage value of the temperature signal to the constant value outside the voltage range when the element temperature of the specific semiconductor element is equal to or higher than the second temperature, the output control circuit being configured to select either the error signal or the temperature signal depending on whether the error signal generation circuit outputs the error signal.

7. The intelligent power module according to claim 6, wherein the temperature signal generation circuit is configured to set a gradient of the temperature signal with respect to the element temperature of the specific semiconductor element to a first gradient when the element temperature of the specific semiconductor element is equal to or higher than the first temperature and lower than a third temperature between the first temperature and the second temperature, and set a gradient of the temperature signal with respect to the element temperature of the specific semiconductor element to a second gradient which is greater than the first gradient when the element temperature of the specific semiconductor element is equal to or higher than the third temperature and lower than the second.

* * * * *